(12) United States Patent
Vandroux et al.

(10) Patent No.: US 7,079,740 B2
(45) Date of Patent: Jul. 18, 2006

(54) USE OF AMORPHOUS CARBON FILM AS A HARDMASK IN THE FABRICATION OF OPTICAL WAVEGUIDES

(75) Inventors: Laurent Vandroux, Saint Nazaire les Eymes (FR); Herve Monchoix, Saint Ismier (FR)

(73) Assignee: Applied Materials, Inc., Santa Clara, CA (US)

( * ) Notice: Subject to any disclaimer, the term of this patent is extended or adjusted under 35 U.S.C. 154(b) by 36 days.

(21) Appl. No.: 10/799,147

(22) Filed: Mar. 12, 2004

(65) Prior Publication Data
US 2005/0199013 A1    Sep. 15, 2005

(51) Int. Cl.
*G02B 6/10*    (2006.01)

(52) U.S. Cl. .................. 385/129; 385/130; 385/131

(58) Field of Classification Search ............... 385/129, 385/130, 131
See application file for complete search history.

(56) References Cited

U.S. PATENT DOCUMENTS

| | | | |
|---|---|---|---|
| 4,425,146 A | 1/1984 | Izawa et al. | |
| 4,426,129 A | 1/1984 | Matsumura et al. | |
| 4,578,097 A | 3/1986 | Berkey | |
| 4,578,691 A | 3/1986 | Murakami et al. | |
| 4,619,680 A | 10/1986 | Nourshargh et al. | |
| 4,709,986 A | 12/1987 | Hicks, Jr. | |
| 4,856,859 A | 8/1989 | Imoto | |
| 4,896,930 A | 1/1990 | Tsuchitani et al. | |
| 4,904,052 A | 2/1990 | Rand et al. | |
| 4,972,799 A | 11/1990 | Misumi et al. | |
| 4,975,144 A | 12/1990 | Yamazaki et al. | |
| 5,022,959 A | 6/1991 | Itoh et al. | |
| 5,125,946 A | 6/1992 | Bhagavatula | |
| 5,165,004 A | 11/1992 | Okamoto et al. | |
| 5,246,198 A * | 9/1993 | Kurihara ................ 249/114.1 |
| 5,253,319 A | 10/1993 | Bhagavatula | |
| 5,263,111 A | 11/1993 | Nurse et al. | |
| 5,333,229 A | 7/1994 | Sayegh | |
| 5,366,530 A | 11/1994 | Weber | |
| 5,378,256 A | 1/1995 | Green et al. | |
| 5,461,003 A | 10/1995 | Havemann et al. | |
| 5,465,860 A | 11/1995 | Fujimoto et al. | |
| 5,567,476 A | 10/1996 | Law et al. | |
| 5,674,573 A | 10/1997 | Mitani et al. | |
| 5,689,614 A | 11/1997 | Gronet et al. | |
| 5,759,913 A | 6/1998 | Fulford, Jr. et al. | |
| 5,770,465 A | 6/1998 | MacDonald et al. | |

(Continued)

FOREIGN PATENT DOCUMENTS

DE    197 23 284 A1    10/1998

(Continued)

OTHER PUBLICATIONS

U.S. Appl. No. 10/768,724, filed on Jan. 30, 2004.

(Continued)

*Primary Examiner*—Kaveh Kianni
(74) *Attorney, Agent, or Firm*—Patterson and Sheridan

(57) ABSTRACT

Methods are provided for forming optical devices, such as waveguides, with minimal defect formation. In one aspect, the invention provides a method for forming a waveguide structure on a substrate surface including forming a cladding layer on the substrate surface, forming a core layer on the cladding layer, depositing an amorphous carbon hardmask on the core layer, forming a patterned photoresist layer on the amorphous carbon hardmask, etching the amorphous carbon hardmask, and etching the core material.

22 Claims, 4 Drawing Sheets

U.S. PATENT DOCUMENTS

| | | | |
|---|---|---|---|
| 5,789,320 A | 8/1998 | Andricacos et al. | |
| 5,858,051 A | 1/1999 | Komiyama et al. | |
| 5,866,920 A | 2/1999 | Matsumoto et al. | |
| 5,881,199 A | 3/1999 | Li | |
| 5,900,288 A | 5/1999 | Kuhman et al. | |
| 5,904,491 A | 5/1999 | Ojha et al. | |
| 5,930,439 A | 7/1999 | Ojha et al. | |
| 5,949,934 A | 9/1999 | Shima et al. | |
| 5,961,924 A | 10/1999 | Reichert et al. | |
| 5,986,344 A | 11/1999 | Subramanion et al. | |
| 5,998,100 A | 12/1999 | Azuma et al. | |
| 5,999,293 A | 12/1999 | Manning | |
| 6,008,140 A | 12/1999 | Ye et al. | |
| 6,024,044 A | 2/2000 | Law et al. | |
| 6,030,901 A | 2/2000 | Hopper et al. | |
| 6,035,803 A | 3/2000 | Robles et al. | |
| 6,043,167 A | 3/2000 | Lee et al. | |
| 6,057,226 A | 5/2000 | Wong | |
| 6,064,118 A | 5/2000 | Sasaki | |
| 6,066,577 A | 5/2000 | Cooney, III et al. | |
| 6,080,529 A | 6/2000 | Ye et al. | |
| 6,097,870 A | 8/2000 | Ranka et al. | |
| 6,098,568 A | 8/2000 | Raoux et al. | |
| 6,103,305 A * | 8/2000 | Friedmann et al. | 427/249.7 |
| 6,140,224 A | 10/2000 | Lin | |
| 6,140,226 A | 10/2000 | Grill et al. | |
| 6,143,476 A | 11/2000 | Ye et al. | |
| 6,151,430 A | 11/2000 | Traver, Jr. et al. | |
| 6,153,935 A | 11/2000 | Edelstein et al. | |
| 6,154,585 A * | 11/2000 | Copner et al. | 385/16 |
| 6,165,890 A | 12/2000 | Kohl et al. | |
| 6,211,065 B1 | 4/2001 | Xi et al. | |
| 6,214,637 B1 | 4/2001 | Kim et al. | |
| 6,214,730 B1 | 4/2001 | Cooney, III et al. | |
| 6,235,629 B1 | 5/2001 | Takenaka | |
| 6,291,334 B1 | 9/2001 | Somekh | |
| 6,316,347 B1 | 11/2001 | Chang et al. | |
| 6,323,119 B1 | 11/2001 | Xi et al. | |
| 6,331,380 B1 | 12/2001 | Ye et al. | |
| 6,333,255 B1 | 12/2001 | Sekiguchi | |
| 6,352,922 B1 | 3/2002 | Kim | |
| 6,358,573 B1 | 3/2002 | Raoux et al. | |
| 6,380,106 B1 | 4/2002 | Lim et al. | |
| 6,386,947 B1 | 5/2002 | Donahue | |
| 6,413,852 B1 | 7/2002 | Grill et al. | |
| 6,423,384 B1 | 7/2002 | Khazeni et al. | |
| 6,428,894 B1 | 8/2002 | Babich et al. | |
| 6,458,516 B1 | 10/2002 | Ye et al. | |
| 6,541,397 B1 | 4/2003 | Bencher | |
| 6,573,030 B1 | 6/2003 | Fairbairn et al. | |
| 6,624,064 B1 | 9/2003 | Sahin et al. | |
| 6,635,583 B1 | 10/2003 | Bencher et al. | |
| 6,635,735 B1 | 10/2003 | Zhang et al. | |
| 6,732,550 B1 * | 5/2004 | Won | 65/386 |
| 6,852,647 B1 * | 2/2005 | Bencher | 438/780 |
| 6,884,733 B1 | 4/2005 | Dakshina-Murthy et al. | |
| 2001/0007788 A1 | 7/2001 | Chang et al. | |
| 2002/0001778 A1 | 1/2002 | Latchford et al. | |
| 2002/0086547 A1 | 7/2002 | Mui et al. | |
| 2002/0090794 A1 | 7/2002 | Chang et al. | |
| 2003/0006140 A1 * | 1/2003 | Vacca et al. | 204/547 |
| 2003/0012483 A1 * | 1/2003 | Ticknor et al. | 385/16 |
| 2003/0041624 A1 * | 3/2003 | Won | 65/386 |
| 2003/0091938 A1 | 5/2003 | Fairbaim et al. | |
| 2004/0023502 A1 | 2/2004 | Tzou et al. | |
| 2004/0038537 A1 | 2/2004 | Liu et al. | |
| 2004/0046963 A1 * | 3/2004 | Lackritz et al. | 356/445 |
| 2004/0166691 A1 | 8/2004 | Nieh et al. | |
| 2004/0180551 A1 | 9/2004 | Biles et al. | |
| 2004/0229470 A1 | 11/2004 | Rui et al. | |
| 2005/0112883 A1 * | 5/2005 | Savas et al. | 438/689 |

FOREIGN PATENT DOCUMENTS

| | | |
|---|---|---|
| DE | 103 28 578 | 2/2004 |
| EP | 0 381 109 | 1/1990 |
| EP | 0 575 157 A1 | 12/1993 |
| EP | 0 803 589 A1 | 10/1997 |
| EP | 0 901 156 | 3/1999 |
| EP | 1 014 121 A2 | 6/2000 |
| JP | 06-263452 | 9/1994 |
| JP | 09 045633 | 2/1997 |
| JP | 11 026578 | 1/1999 |
| JP | 11-052159 | 2/1999 |
| WO | WO 00/05763 | 2/2000 |

OTHER PUBLICATIONS

U.S. Appl. No. 10/799,146, filed on Mar. 12, 2004.
U.S. Appl. No. 10/800,112, filed on Mar. 12, 2004.
U.S. Appl. No. 10/383,839, filed on Mar. 7, 2003.
PCT International Search Report for PCT/US 01/47493, dated Dec. 10, 2002.
PCT Written Opinion for PCT/US 01/47493, dated Mar. 12, 2004.
A. Kilian, et al. "Birefringence Free Planar Optical Waveguide Made by Flame Hydrolysis Deposition (FHD) Through Tailoring of the Overcladding", *J. Lightwave Tech.* vol. 18, No. 2 (Feb. 2000).
Kashimura, et al., "Loss Reduction of $GeO_2$-Doped Silica Waveguide with High Refractive Index Difference By High-Temperature Annealing", 39 *Jpn. J. Appl. Phys.* vol. 39 No. 6A, Pt. 2 (Apr. 2000).
Tan, et al., "Fabrication of Gratings and Design of Diffractive Optical Elements Embossed on Sol-Gel Films"*SPIE Conf. on Design, Fabrication & Characterization of Photonic Devices* (Nov. 1999).
Sun, et al., "Building Passive Components with Silica Waveguides", *SPIE Conf. on Terahertz & Gigahertz Photonics,* pp. 313-319 (Jul. 1999).
Jung, et al., "Inductively Coupled Plasma Etching of Ge-Doped Boron-Phosphosilicate Glass for Planar Lightwave Circuit Devices", *J. Non-Crystalline Solids,* vol. 259, pp. 191-197 (1999).
Ruano, et al. "Fabrication of Integrated Microanalytical Chambers and Channels for Biological Assays Using Flame Hydrolysis Deposition Glass", *Microelectronic Eng.,* vol. 46 (1999), pp. 419-422.
Ruano, et al., "Lab-on-a-Chip Devices Fabricated Using Flame Hydrolysis Deposited Glass", Inst. Of Elec. Eng. (1999), pp. 12/1-12/6.
Andrews. M., "An Overview of Sol Gel Guest-Host Materials Chemistry for Optical Devices", 2997 SPIE (1997), pp. 48-59.
Kobayashi, S., Recent Development on Silica Waveguide Technology for Integrated Optics, 2997 SPIE (1997), pp. 264-270.
Ding, et al., "Wavelet Structural Analysis of Silica Glasses Manufactured by Different Methods", *J. Non-Crystalline Sol.*, vol. 222 (1997), pp. 50-58.
Beguin, et al., "Planar Optical Devices for Use in Multi-Wavelength Systems", IEEE (1997), pp. 504-505.
Ojha, "Fabrication Technologies for Planar Waveguide WDM Components", 3211 SPIE (Dec. 1996), pp. 612-621.
Chun, et al. "Birefringence Reduction in a High Boron-Doped Silica-on-Silicon Planar Optical Waveguide", *J. Korean Phys. Soc.,* vol. 29, No. 1 (Feb. 1996), pp. 140-142.
Li, et al. "Silica-Based Optical Integrated Circuits", *IEE Proc. Optoelectron* , vol. 143, No. 5 (Oct. 1996), pp. 263-280.

Wu, et al., "Fabrication of High Concentration Rare-Earth-Doped Silica-Based Waveguide by MCVD Method", *IEEE Photonics Tech. Letters,* vol. 7, No. 6 (Jun. 1995), pp. 655-657.

Sun, et al., "Light Coupling from Diode Lasers to Microlensed Silica Waveguides", Conference on Optical Fiber Communication, vol. 8 (1995), pp. 228-229.

Sun, et al. "Silica Waveguide Circuits with Low Polarisation Dependence Fabricated on Silica Substrates", *Electronics Letters,* vol. 30 (Nov. 24, 1994), pp. 2032-2034.

Tsukahara, et al., "Evaluation of Layered Structures for Micromachines by Means of Ultrasonic Micro-Spectroscopy", *1994 Ultrasonics Symposium* (1994), pp. 1429-1432.

Sun, et al., "High Silica Waveguides on Alumina Substrates for Hybrid Optoelectronic Integration", *IEEE Photonics Tech. Letters,* vol. 4, No. 6 (Jun. 1992), pp. 630-632.

Sun, et al., "Silica-Based Circular Cross-Sectioned Channel Waveguides", *IEEE Photonics Tech. Letters,* vol. 3, No. 3 (Mar. 1991), pp. 238-240.

Ikunishi, et al., "A Study of Fabricating Silica Glass Waveguide by LP-CVD", (1987) pp. 66-69.

Sun, et al., "1xN Splitters on Silica Substrates with Low Polarization Dependent Loss", pp. 243-244.

Liu, et al., "Generating Sub-30nm Poly-Silicon Gates Using PECVD Amorphous Carbon as Hardmask and Anti-Reflective Coating", Proceedings of the SPIE, Bellingham, VA, US, vol. 5040, No. 1, Feb. 25, 2003, pp. 841-848.

PCT Notification of Transmittal of the International Search Report dated May 31, 2005 for PCT/US05/008070.

PCT Written Opinion dated May 31, 2005 for PCT/US05/008070.

PCT International Search Report for PCT/US05/005855 dated Oct. 13, 2005.

PCT Written Opinion for PCT/US05/005855 dated Oct. 13, 2005.

* cited by examiner

USE OF AMORPHOUS CARBON FILM AS A HARDMASK IN THE FABRICATION OF OPTICAL WAVEGUIDES

BACKGROUND OF THE INVENTION

1. Field of the Invention

Embodiments of the present invention generally relate to methods and apparatus for fabricating optical devices, such as optical integrated circuits (ICs).

2. Description of the Related Art

Optical systems are emerging technologies that offer solutions to many previously unsolvable technological problems. Thus, optical systems are now gaining an ever increasing importance in the technology world of today. Generally, optical systems utilize pulses of light rather than electric current to carry out such functions as data transmission, data routing, or other forms of data communication or data processing. One important structure commonly utilized in optical systems is an optical waveguide.

Optical waveguides are used to confine and direct light between the various components of an optical system. For example, optical waveguides may be used to carry Dense Wavelength Division Multiplexed (DWDM) light, which is used to increase the number of wavelengths in a single waveguide to achieve a higher aggregate bandwidth. FIG. 1 is a cross-sectional view of an optical fiber waveguide. The general structure of an optical waveguide 100 comprises two principal components: a core 103 surrounded by one or more cladding layers 102, 106. The core 103 is the inner part of the fiber through which light is guided. It is surrounded completely by the cladding layers 102, 106, which generally have lower refractive indexes than the core 103 to allow a light ray 105 in the core 103 that strikes the core/cladding boundary at a glancing angle to be confined within the core 103 by total internal reflection. The confinement angle $\theta_c$ represents an upper limit for the angle at which the light ray 105 can strike the boundary and be confined within the core 103.

Fabrication of planar optical components on silicon and silica substrates currently exists. The waveguide must be isolated from the silicon substrate to avoid interfering with the light wave traveling down the waveguide as shown with the cladding layers 102, 106 in FIG. 1. Light waves traveling in a waveguide comprise two orthogonally polarized modes. For waveguide applications, one polarization is horizontal to the substrate and the other polarization is orthogonal to the substrate. If the lower cladding is too thin, the two orthogonal modes see a different effective refractive index resulting in birefringence, a consequential dispersion phenomenon that would limit the width of the transmission window.

A conventional waveguide structure requires at least three deposition steps and one mask level. For example, the lower cladding layer must first be deposited to isolate the substrate from the waveguide structure. Next, a core layer is deposited and patterned with a mask layer to form the waveguide paths. An upper cladding layer is then deposited thereover. The upper cladding layer must be thick enough to prevent interference from external ambient light, i.e., light from the environment outside the device. In addition, each of these layers may, and currently do, require post deposition heat treatment to obtain the desired optical properties.

However, the use of traditional mask materials to pattern and etch the core material 103, such as photoresist and/or silicon nitride has resulted in difficulties in forming the patterned core materials 103. Further, photoresist material and silicon nitride have had difficulties in being removed from the core material without forming defects in the core material, such as malformed features and roughing the core material surfaces. Such defects may result in propagation loss or attenuation, one optical waveguide core characteristic that is critical to the performance of an optical system.

Attenuation refers to the loss of light energy as a pulse of light propagates down a waveguide channel. The two primary mechanisms of propagation loss are absorption and scattering. Absorption is caused by the interaction of the propagating light with impurities in or on the waveguide channel, such as insufficiently removed mask residues. For example, electrons in the impurities may absorb the light energy and undergo transitions or give up the absorbed energy by emitting light at other wavelengths or in the form of vibrational energy (i.e., heat or photons). The second primary mechanism, scattering, results from imperfections in the surfaces of the core materials that cause light to be redirected out of the fiber, thus leading to an additional loss of light energy.

Thus, there is a need for an improved method of manufacturing optical waveguides with minimal propagation loss.

SUMMARY OF THE INVENTION

The present invention generally provides methods for forming optical devices, such as waveguides, with minimal defect formation. In one aspect, the invention provides a method for forming a waveguide structure on a substrate surface including forming a cladding layer on the substrate surface, forming a core layer on the cladding layer, depositing an amorphous carbon hardmask on the core layer, forming a patterned photoresist layer on the amorphous carbon hardmask, etching the amorphous carbon hardmask, and etching the core material.

In another aspect, the invention provides a method for forming a waveguide structure on a substrate surface including forming a first cladding layer on the substrate surface, forming a core layer on the first cladding layer, depositing an amorphous carbon hardmask on the core layer, forming a patterned photoresist layer on the amorphous carbon hardmask, etching the amorphous carbon hardmask, etching the core material, removing the amorphous carbon hardmask, and forming a second cladding over the exposed core material.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Aspects of the invention generally provide methods for depositing, processing and removing amorphous carbon material disposed on a core material with minimal or reduced defect formation in forming optical devices, such as waveguides. The words and phrases used herein should be given their ordinary and customary meaning in the art by one skilled in the art unless otherwise further defined.

Figure 2:
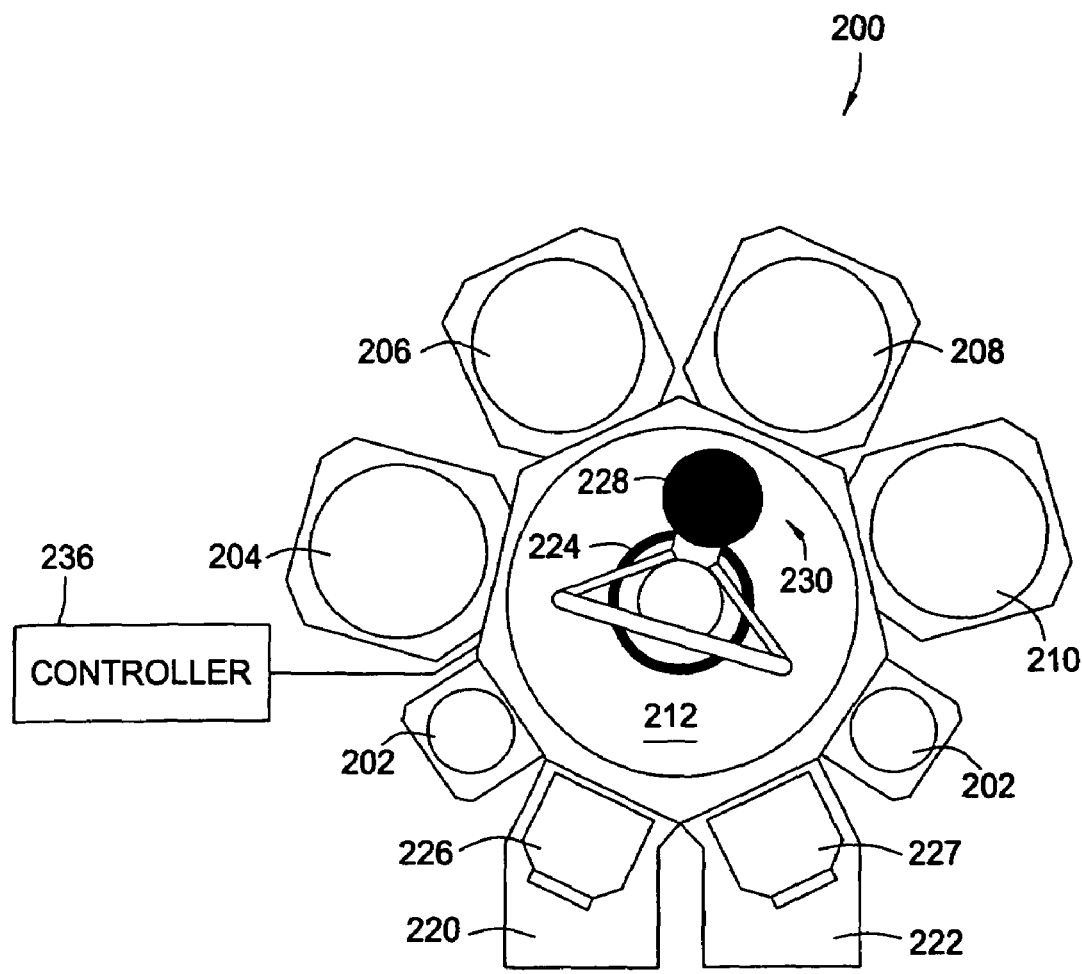
FIG. 2 is a schematic partial view of one embodiment of a cluster tool for executing processing steps of the present invention.

FIG. 2 is a schematic partial view of one embodiment of a conventional cluster tool, or integrated system, for executing processing steps described herein. An integrated system is desirable to perform a sequence of processing steps while maintaining the substrate in a vacuum environment to reduce contamination and increase throughput. It is contemplated to execute certain processing steps of the novel technique in a cluster tool, similar to, for example, the cluster tool known as the Centura® system manufactured by Applied Materials, Inc. of Santa Clara, Calif.

As schematically illustrated in FIG. 2, an exemplary cluster tool 200 includes, for example, four process chambers 204, 206, 208, 210, a transfer chamber 212, orienter/cooldown chambers 202, and loadlock chambers 220 and 222. The transfer chamber 212 is centrally located with respect to the loadlock chambers 220 and 222, the orienter/cooldown chamber 202 and process chambers 204, 206, 208, 210.

The processing chambers 204, 206, 208, 210, may be adapted to perform any number of process steps of the invention including, for example, material deposition, etching, photoresist removal, planarization, and amorphous carbon removal, among others. The processing chambers 204, 206, 208, and 210, may comprise all deposition chambers, all etching chambers, or a combination of deposition and etching chambers. Suitable deposition chambers include parallel plate chambers, such as the DxZ™ deposition chamber, XT Producer™ deposition chamber, and the XL deposition chamber, all commercially available from by Applied Materials, Inc. of Santa Clara, Calif. Suitable etch chambers include reactive ion etch chambers, such as the EMax™ etch chamber, the MxP+™ etch chamber, the EMxP+™ etch chamber, and the Super EMxP+™ etch chamber deposition chamber, all commercially available from by Applied Materials, Inc. of Santa Clara, Calif.

To effectuate substrate transfer amongst the chambers, the transfer chamber 212 contains a robotic transfer mechanism 224. The transfer chamber 212 has access to the four process chambers 204, 206, 208, and 210, as well as the orienter/cooldown chambers 202 and loadlocks 220 and 222. Substrate 228 may be transferred from storage to the system in a transport cassette 226 that is placed within loadlock chamber 220. The robotic transport mechanism 224 transports the structure 228 from cassette 226 to any of the four process chambers 204, 206, 208 and 210 or orienter/cooldown chambers 202. Typically, a given substrate 228 is first placed in the orienter/cooldown chamber 202 and transferred to process chambers 204, 206, 208, and 210, for processing, such as deposition or etching. Individual substrates 228 are carried upon a transport blade 230 that is located at the distal end of the robotic mechanism 224. The transport operation can be controlled by a controller 236.

Once the substrate 228 has been processed in chamber 204, the substrate can be transported to, for example, chamber 210, for additional processing if necessary. Following completion of processing within the process chambers, the transport mechanism 224 moves the substrate from the process chamber and transports the structure to the cooldown chamber 202. The substrate is then removed from the cooldown chamber using the transport mechanism 224 within the transfer chamber 212. Lastly, the processed substrate 228 is placed in the transport cassette 227 within the loadlock chamber 222.

The controller 236 may include conventional computers and computer systems including one or more computers that are operably connected to other computers or to a network of computers or data processing devices. Suitable computers include computers commonly known as personal computers. The data structure that is used by controller 236 can be stored on a removable electronic data storage medium such as computer floppy disks, removable computer hard disks, magnetic tapes and optical disks, to facilitate the use of the same data structure at different manufacturing locations. Alternatively, the data structure can be stored on a non-removable electronic data storage medium, including a medium positioned at a location that is remote (not shown) from controller 236, using such data storage devices conventionally known. The data structure can be communicated from a remote location to controller 236 using communicating techniques including, for example, hard wire connections, wireless connections and data communication methods utilizing one or more modems or techniques using one or more computers commonly known as servers. The data storage medium can be operably connected to the controller using conventional methods and device components.

Fabrication Process

FIGS. 3A–3G illustrate one embodiment of sequence of deposition and etching steps of the present invention, wherein the substrate is maintained in a vacuum environment thus minimizing, or avoiding, the possible degradation of etched surfaces resulting from breaking vacuum prior to a subsequent layer deposition on the etched surface. In the illustrative process shown in FIGS. 3A–3G, a blanket-etch approach may be used that includes forming a continuous core layer across the entire substrate, then defining the optical cores by patterning, and then etching away unwanted portions of the core layer.

Figure 3A:
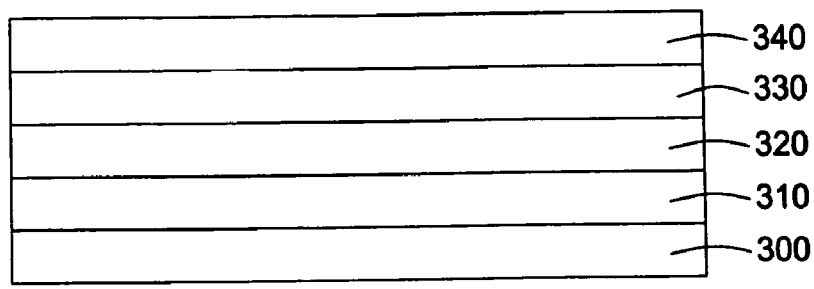
FIGS. 3A–3E illustrate one embodiment of a method for forming an optical waveguide.

As shown in FIG. 3A, a stack of material is deposited on a substrate 300 of a suitable material, for example, silica, to begin the fabrication process. A first cladding layer 310 of a dielectric material, such as silicon oxide, is disposed on the substrate 300, such as epitaxial silicon. A core material 320 is deposited on the first cladding layer 310. An amorphous carbon later 330 is deposited as a hardmask on the core material 320. A photoresist material 340 is deposited on the amorphous carbon layer 330.

The cladding layer 310 may comprise any material having a lower refractive index than the core material 320. In one example, a silicon-based dielectric material having a higher refractive index less than the core material may be used and may include undoped silica ($SiO_2$) glass ("USG"), thermal oxides, such as a high-pressure oxide, or silicon dioxide doped with boron and phosphorous.

An example of a deposition process includes depositing on the substrate 300, a cladding layer 310 of silicon dioxide doped with boron and phosphorous (BPSG) by introducing tetraethyloxysilane ($Si(OC_2H_5)_4$), (TEOS) at a flow rate of about 700 mgm, triethylborate (TEB) at a flow rate of about 230 mgm, triethylphosphate (TEPO) at a flow of about 42 mgm, oxygen gas at a flow rate of about 650 sccm, and an inert gas at a flow rate of about 600 sccm, into a PECVD reactor maintained at a temperature between about 350° C. and about 550° C., for example, between about 400° C. and about 480° C., at a chamber pressure of 9 Torr and generating a plasma at an RF power of about 1150 watts to deposit a layer having a thickness of about 5 microns that can be deposited in about 5 minutes, a deposition rate of about 1 micron/min.

The core material 320 may comprise a material suitable for allowing light to pass therethrough with minimal degradation of the signal. Suitable core materials include germanium doped silicon dioxide, germanium boron doped silicon dioxide silicon-germanium compositions, phosphorous doped silicon dioxide, and combinations thereof. The material may be deposited by physical vapor deposition techniques, chemical vapor deposition techniques including high-density plasma process such as an HDP-CVD process or an HDP-ECR process, or other suitable deposition techniques conventionally used to deposit such materials.

An example of the deposition of a core material is introducing reactant gases comprising silane and phosphorous, derived from phosphine ($PH_3$), and an oxidizing gas, such as oxygen, into the PECVD reactor heated at between about 350° C. and about 550° C., for example, between about 400° C. and about 480° C. for a period of about 5 minutes to form a phosphorous doped silicon oxide layer about 5 microns thick at typical conditions of RF power, chamber pressure, and source fluxes used in the deposition of silane-based oxides in the silicon industry.

Another example of the deposition of a core material is introducing reactant gases comprising germane ($GeH_4$) at a flow rate of about 220 sccm, silane at a flow rate of about 200 sccm, and nitrous oxide ($N_2O$), an oxidizing gas, at a flow rate of 2400 sccm, into the PECVD reactor heated at between about 350° C. and about 550° C., for example, between about 400° C. and about 480° C., at a chamber pressure of about 4 Torr, and generating a plasma by applying a first RF power of about 380 Watts at 13.56 MHz and a second RF power of about 180 Watts and about 350 KHz to deposit germanium doped silicon oxide material at a deposition rate of up to about 1.8 microns/minute.

A particular advantage of using a silane based PECVD process to form the core material 320 is that silane provides a highly stoichiometric composition of silicon dioxide on which the index of refraction of silicon dioxide is dependent. The stoichiometric silicon dioxide material has the lowest optical loss of silicon:oxide atomic rations. Furthermore, it is believed that silane deposits films with lower carbon content than precursors, such as TEOS, which, when combined with an oversaturation of oxygen, produces a highly stoichiometric composition of silicon dioxide.

The core material 320 as described herein may have a refractive index differential from the cladding layers sufficient to provide optical waveguiding in the core layer for most integrated optics applications. The core material generally has a refractive index between about 0.5% and about 1.5%, such as about 1% difference, greater than a cladding layer. For example, about 1% refractive index step between the core material 320 and the cladding layers has been determined to achieve low loss in the waveguide and make it possible to introduce curved sections having a radius of curvature as small as 15 mm without additional losses. Further, a waveguide formed using about 1% refractive index step can have a core size and far field pattern readily matching those of standard optical fibers, thus permitting efficient coupling of such waveguide devices to optical fibers.

The difference between the cladding layer and core material refractive index may be between about 0.5% and about 1.5%, such as about 1% difference, for an oxide core material. For example, The refractive index difference can be stated as a refractive difference of the core material greater than the cladding material of up to about 0.06, such as between about 0.01 and about 0.022, for example, about 0.015, for a silica cladding layer versus a doped oxide as the core material. The material may be deposited by physical vapor deposition techniques, chemical vapor deposition techniques, or other suitable deposition techniques conventionally used to deposit such materials. Dopants, such as boron and phosphorus, are incorporated in the dielectric material to alter optical materials.

Alternatively, other silicon containing material may be used for the core material, which provides for a refractive index difference and percentage difference. For example, silicon nitride has a refractive index of about 2 compared to doped silica index of about 1.445, with a difference in the refractive indexes of up to about 0.6, and typically between about 0.02 and about 0.6. Silicon oxynitride may also be used as a core material and provide a difference between the cladding layer and core material refractive index up to about 1.7%. The invention further contemplates that the refractive indexes of the core material and the cladding materials may change based on the materials presently known or unknown being used, and that such materials are contemplated in the processes described herein.

The cladding layers and the core material may be deposited in one or more layers of approximately 5 to 6 microns in thickness. For example, a 15 micron thickness for the cladding layer 310 may be deposited by three 5 micron layers. The cladding layers and the core material may be thermally treated after each deposition process to improve layer properties and improve uniformity. A thermal treatment may comprise exposing the deposited material to a temperature between about 1000° C. and about 1100° C. for a time between about 2 and about 4 hours. For example, a thermal treatment may be made after every 5 micron deposition for a 15 micron cladding layer.

Next, a hardmask layer 330 may be deposited on the core material. The hardmask material generally comprises amorphous carbon. The amorphous carbon material is deposited on a core material for patterning and etching the core material 320 to form the desired structures therein. The amorphous carbon material provides an etch selectivity, or removal rate ratio, to the core material (amorphous carbon: core material) of greater than 1:5, such as between about 1:8 and about 1:15. It is believed that the use of amorphous carbon as a strippable hardmask provides a greater etch selectivity for "deep" oxide etch of up to 7 μm oxide in depth.

An amorphous carbon layer may be deposited by a process including introducing a gas mixture of one or more hydrocarbon compounds into a processing chamber. The hydrocarbon compound preferably has a formula $C_xH_y$, where x has a range of between 2 and 4 and y has a range of between 2 and 10. For example, propylene ($C_3H_6$), propyne ($C_3H_4$), propane ($C_3H_8$), butane ($C_4H_{10}$), butylene ($C_4H_8$), butadiene ($C_4H_6$), or acetelyne ($C_2H_2$) as well as combinations thereof, may be used as the hydrocarbon compound. Alternatively, compounds having five or more carbon atoms, such as benzene or toluene may be used to form the amorphous carbon layer.

Optionally, an inert gas of noble gases, including Argon (Ar) and Helium (He), and relatively inert gases, such as nitrogen ($N_2$), may be included in the processing gas. Inert gases may be used to control the density and deposition rate of the amorphous carbon layer. A mixture of reactive gases and inert gases may be added to the processing gas to deposit an amorphous carbon layer. Similarly, a variety of reactive processing gases may be added to the gas mixture to modify properties of the amorphous carbon material. Reactive gases, such as hydrogen ($H_2$), ammonia ($NH_3$), a mixture of hydrogen ($H_2$) and nitrogen ($N_2$), or combinations thereof may be used to control the hydrogen ratio of the amorphous carbon layer to control layer properties, such as reflectivity. The amorphous carbon material may include dopants, such as halides, for example, fluorine, which may be introduced into the material by partially or fully fluorinated hydrocarbons. Processing gases other than the hydrocarbon gas may respectively be introduced into the system at flow rates between about 50 and about 5000 sccm for a 200 mm substrate.

The amorphous carbon layer is then deposited from the processing gas using the following deposition process parameters. The substrate is maintained at a substrate temperature between about 100° C. and about 550° C., such as between about 350° C. and about 500° C., a chamber pressure is maintained between about 1 Torr and about 20 Torr, the hydrocarbon gas ($C_xH_y$) has a flow rate between about 50 sccm and about 5000 sccm for a 200 mm substrate, a plasma is generated by applying a RF power of between about 0.05 W/cm$^2$ and about 4 W/cm$^2$, or between about 20 watts (w) and about 1000 W for a 200 mm substrate, with a gas distributor being between about 300 mils and about 600 mils from the substrate surface. The above process parameters provide a typical deposition rate for the amorphous carbon layer in the range of about 500 Å/min to about 4000 Å/min and can be implemented on a 200 mm substrate in a deposition chamber, such as the DxZ™ processing chamber commercially available from Applied Materials, Inc. The amorphous carbon deposition parameters provided herein are illustrative and should not be construed as limiting the scope of the invention.

Alternatively, a dual-frequency system may be applied to deposit the amorphous carbon material. A dual-frequency source of mixed RF power provides a high frequency power in a range between about 10 MHz and about 30 MHz, for example, about 13.56 MHz, as well as a low frequency power in a range of between about 100 KHz and about 500 KHz, for example, about 350 KHz. An example of a mixed frequency RF power application may include a first RF power with a frequency in a range of about 10 MHz and about 30 MHz at a power in a range of about 200 watts to about 1000 watts and at least a second RF power with a frequency in a range of between about 100 KHz and about 500 KHz as well as a power in a range of about 1 watt to about 200 watts. The ratio of the second RF power to the total mixed frequency power is preferably less than about 0.6 to 1.0. Alternatively, a dual-frequency system may be used to deposit the cladding and core materials as described herein.

The high frequency RF power and the low frequency RF power may be coupled to a gas distributor, or showerhead, a substrate support, or one may be coupled to the showerhead and the other to the support pedestal. Details of the mixed RF power source 119 are described in commonly assigned U.S. Pat. 6,041,734, entitled, "Use of an Asymmetric Waveform to Control Ion Bombardment During Substrate Processing", issued on Mar. 28, 2000, and is herein incorporated by reference.

One example of the deposition of an amorphous carbon layer includes introducing propylene ($C_3H_6$) at a flow rate between about 140 and about 600 sccm, helium at a flow rate of about 325 sccm, into the PECVD reactor heated at about 550° C. and at a chamber pressure between about 6 Torr and about 8 Torr, and generating a plasma by applying a RF power of about 700 Watts at 13.56 MHz with a spacing between the distributor (showerhead) and substrate between about 220 mils and about 270 mils.

The amorphous carbon layer comprises carbon and hydrogen atoms, which may be an adjustable carbon:hydrogen ratio that ranges from about 10% hydrogen to about 60% hydrogen. Controlling the hydrogen ratio of the amorphous carbon layer is desirable for tuning the respective optical properties, etch selectivity and chemical mechanical polishing resistance properties. Specifically, as the hydrogen content decreases the optical properties of the as-deposited layer such as for example, the index of refraction (n) and the absorption coefficient (k) increase. Similarly, as the hydrogen content decreases the etch resistance of the amorphous carbon layer increases.

The light absorption coefficient, k, of the amorphous carbon layer can be varied between about 0.1 to about 1.0 at wavelengths below about 250 nm, such as between about 193 nm and about 250 nm, making the amorphous carbon layer suitable for use as a hardmask. The absorption coefficient of the amorphous carbon layer can be varied as a function of the deposition temperature. In particular, as the temperature increases the absorption coefficient of the as-deposited layer likewise increases. For example, when propylene is the hydrocarbon compound the k value for the as-deposited amorphous carbon layers can be increased from about 0.2 to about 0.7 by increasing the deposition temperature from about 150° C. to about 480° C.

The absorption coefficient of the amorphous carbon layer can also be varied as a function of the additive used in the gas mixture. In particular, the presence of hydrogen ($H_2$), ammonia ($NH_3$), and nitrogen ($N_2$), or combinations thereof, in the gas mixture can increase the k value by about 10% to about 100%. The amorphous carbon layer is further described in commonly assigned U.S. Pat. No. 6,573,030, issued Jun. 3, 2003, entitled, "Method for Depositing an Amorphous Carbon Layer", which is incorporated herein to the extent not inconsistent with the claimed aspects and description herein.

In an alternate embodiment, the amorphous carbon layer can have an absorption coefficient (k) that varies across the thickness of the layer. That is, the amorphous carbon layer can have an absorption coefficient gradient formed therein. Such a gradient is formed as a function of the temperature and the composition of the gas mixture during layer formation.

At any interface between two material layers, reflections can occur because of differences in their refractive indices (n) and absorption coefficients (k). When the amorphous carbon hardmask has a gradient, it is possible to match the refractive indices (n) and the absorption coefficients (k) of the two material layers so there is minimal reflection and maximum transmission into the amorphous carbon hardmask. Then the refractive index (n) and absorption coefficient (k) of the amorphous carbon hardmask can be gradually adjusted to absorb all of the light transmitted therein.

Figure 1:
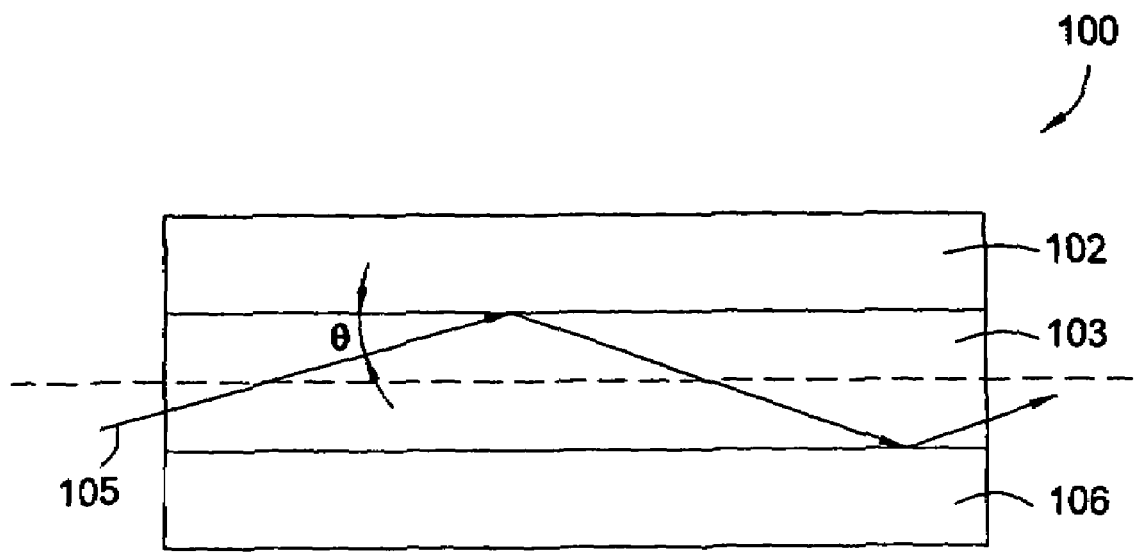
FIG. 1 is a prior art cross-sectional view of an optical waveguide.
Figure 3B:
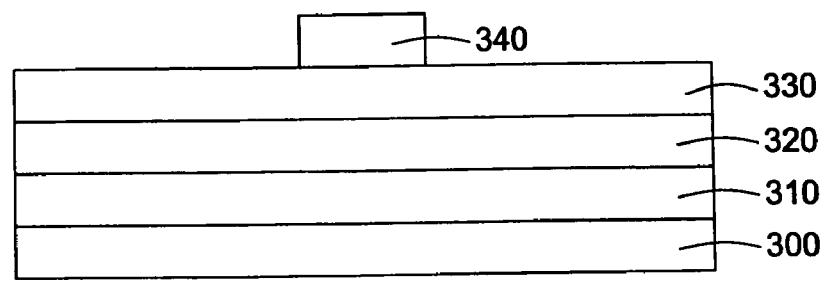

An energy resist layer 340, such as a photoresist or e-beam resist, may then be deposited on the hardmask layer 330. An energy resist material 340 is deposited and patterned on the surface of the hardmask layer 330 as shown in FIG. 3B. The resist layer 150 can be spin coated on the substrate to a thickness within the range of about 200 Å to about 6000 Å. Photoresist materials are sensitive to ultraviolet (UV) radiation having a wavelength less than about 450 nm. DUV resist materials are sensitive to UV radiation having wavelengths of 245 nm or 193 nm. An image of a pattern is introduced into the layer of resist material 150 by exposure to UV radiation via a photolithographic reticle. The image of the pattern introduced in the layer of resist material 150 is developed in an appropriate developer to define the pattern as shown in FIG. 1A.

Figure 3C:
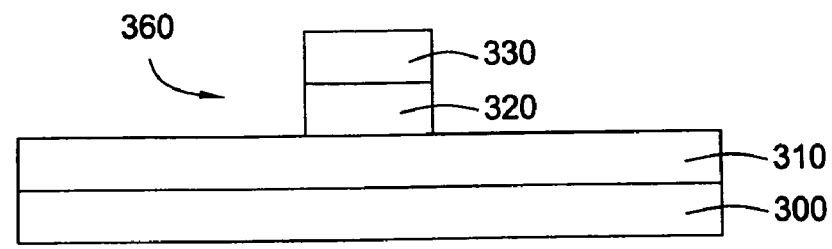

The pattern defined in the energy resist layer 340 is transferred through the hardmask layer 330 as shown in FIG. 3C. The pattern is transferred through the hardmask layer 330 by etching using an appropriate chemical etchant. For example, plasmas of ozone, oxygen, flurorcarbons, hydrogen, halide-containing compounds, ammonia, or combinations thereof may be used to etch amorphous carbon materials. Multiple etching step including variable etching gas composition may be use to etch through the hardmask layer 330. Optionally, any remaining resist material after the etching process may be removed prior to further processing.

The patterned formed in the hardmask layer 330 may then be transferred to the core material layer 320 and any intervening layer by etching using an appropriate chemical etchant to form features 360 as shown in FIG. 3C. For example, if the core material 320 comprises a Germanium doped silicon oxide layer, an etchant gas of oxygen and fluorocarbons may be used. Other compounds, such as hydrocarbons, such as methane and ethane commonly used in via etch gases may also be used. Hardmask layer 330 is utilized for subtractively anisotropically etching the core material 320. The etch procedure of the embodiment may over-etch the core material 320 to ensure complete formation of structures 320. Preferably, the etch processes provide optically smooth side surfaces to minimize any interference with optical properties of the core material 320 and any adjacent cladding layers.

An anneal step as described as a thermal treatment herein may also be included before the core material 320 etch process to further improve optical quality to reduce any propagation loss. An anneal step, for example, may utilize a temperature between about 1000° C. and about 1100° C. for between about 2 and about 4 hours, such as an anneal step carried out at 1000° C. for 2 hours.

Figure 3D:
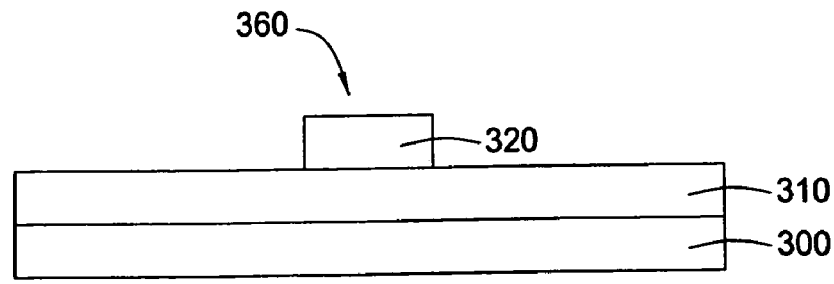

The hardmask layer 330 is then removed from the core material surface 320 as shown in FIG. 3D. Optionally, while not shown, an etch back step can be employed to obtain an optically smooth top surface of the core material 320 after removal of the hardmask layer 330. Removal of the amorphous carbon material from the core material may be achieved by subjecting the amorphous carbon layer to a plasma of a hydrogen-containing gas and/or an oxygen-containing gas. The plasma of the hydrogen-containing gas and/or the oxygen-containing gas is believed to remove the amorphous carbon material with minimal effect of the surface roughness of the core material disposed thereunder.

The plasma treatment generally includes providing the hydrogen containing gas including hydrogen, ammonia, water vapor ($H_2O$), or combinations thereof, or alternatively oxygen, to a processing chamber at a flow rate between about 100 sccm and about 1000 sccm, preferably between about 500 sccm and about 1000 sccm, and generating a plasma in the processing chamber. The plasma may be generated using a power density ranging between about 0.15 $W/cm^2$ and about 5 $W/cm^2$, which is a RF power level of between about 50 W and about 1500 W for a 200 mm substrate. The RF power can be provided at a high frequency such as between 13 MHz and 14 MHz. The RF power can be provided continuously or in short duration cycles wherein the power is on at the stated levels for cycles less than about 200 Hz and the on cycles total between about 10% and about 30% of the total duty cycle. The plasma may be generated remotely, such as by a remote plasma source, or may be generated by a microwave in addition to or in replace of a RF power.

The processing chamber is generally maintained at a chamber pressure of between about 1 Torr and about 10 Torr, preferably between about 3 Torr and about 8 Torr. The substrate is maintained at a temperature between about 100° C. and about 300° C. during the plasma treatment, preferably, between about 200° C. and about 300° C. The plasma treatment may be performed between about 15 seconds and about 120 seconds, or as necessary to remove the amorphous carbon material. The processing gas may be introduced into the chamber by a gas distributor, the gas distributor may be positioned between about 100 mils and about 2000 mils from the substrate surface, preferably positioned between about 200 mils and about 1000 mils, during the plasma treatment. However, it should be noted that the respective parameters may be modified to perform the plasma processes in various chambers and for different substrate sizes, such as 300 mm substrates.

A suitable reactor for performing the amorphous carbon material deposition and the hydrogen containing gas or oxygen containing gas plasma removal of the amorphous carbon materials described herein may be performed in a DxZ™ chemical vapor deposition chamber, a Producer™ processing chamber, XT Producer™ deposition chamber, the XL deposition chamber, the ASP™ processing chamber, the ASP+™ processing chamber, and the Axiom™ processing chamber, all commercially available from Applied Materials, Inc., of Santa Clara, Calif.

Figure 3E:
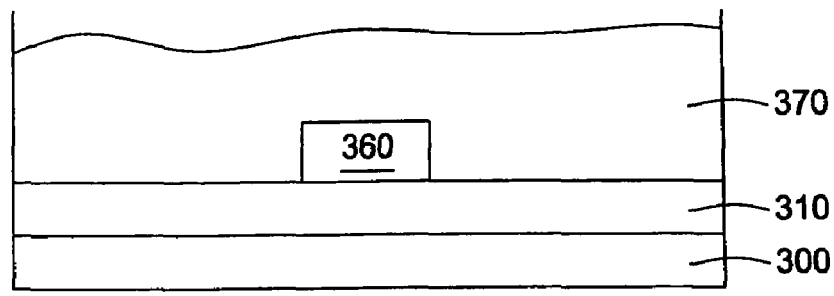
Figure 3F:
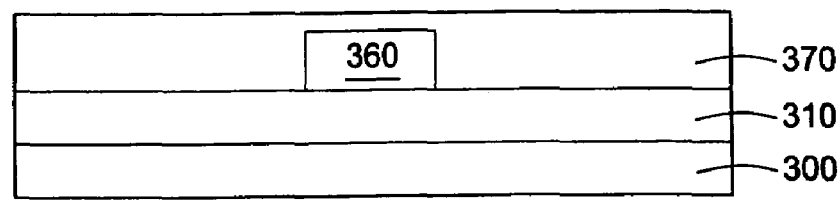

A core encapsulation material 370, typically of a cladding material described herein may be deposited on the core material structure 360 as shown in FIG. 3E.

Alternatively, the core encapsulation material 370 may then be polished to near the core material structure 360, such as within 15 microns of the core material structure 360. With the smooth side walls formed from the etch process described for the core material 320, the core encapsulation material 370 is believed to form a side and top cladding layer with minimal optical degradation and propagation loss. The core encapsulation material may also form the upper cladding layer.

Figure 3G:
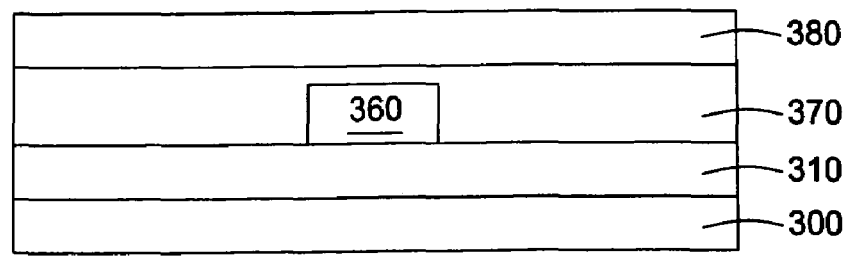

Alternatively, an alternative upper cladding layer 380 may then be deposited on the core material 320 and core encapsulation material 370 to further encapsulate the structure 360 as shown in FIG. 3G. The upper cladding layer 380 is generally formed of the same material by the same or similar process as the lower cladding layer 310 and may have similar optical properties. Alternatively, the upper cladding layer 380, the core encapsulation material 370, and the lower cladding material 310 may have different optical properties depending on the requirements of the structure 360 being formed and the requirements of the operator. Optical properties may be modified by using different cladding material or by varying the dopant concentrations in the deposited cladding materials. Alternatively, the core encapsulation material 370 and the upper cladding layer 380, may be the same material formed by the process shown in FIG. 3E but with only a partial removal of material during the planarization process.

For example, an upper cladding layer 380 of silicon dioxide is deposited by introducing reactant gases comprising silane, phosphorous, derived from TEPO, and boron, derived from TMB, into the PECVD reactor and heating between about 350° C. and about 550° C. to form an upper cladding layer of about 5 microns in thickness. The resultant structure is then heated at a temperature between about 950° C. and about 1100° C. for up to 4 hours. The high temperature anneal transforms the layer into optical quality glass and reflows to assure conformal coating of the core material 320. The deposition and annealing process may be repeated a number of times to produce a layer of the desired thickness. The thermal process may be used to reflow the deposited materials and planarize the surface of the deposited material. The addition of dopants, such as boron, to the upper cladding layer 380, is to lower the reflow temperature to enhance the reflow process and smoothly cover the core material 320.

While the foregoing is directed to embodiments of the present invention, other and further embodiments of the invention may be devised without departing from the basic scope thereof, and the scope thereof is determined by the claims that follow.

What is claimed is:

1. A method for forming a waveguide structure on a substrate surface, comprising:
    forming a cladding layer on the substrate surface;
    forming a core layer on the cladding layer;
    depositing an amorphous carbon hardmask on the core layer, wherein depositing the amorphous carbon hardmask comprises introducing into a processing chamber one or more hydrocarbon compounds having the general formula $C_xH_y$, wherein x has a range of 2 to 4 and y has a range of 2 to 10, and generating a plasma of the one or more hydrocarbon compounds;
    forming a patterned photoresist layer on the amorphous carbon hardmask;
    etching exposed amorphous carbon hardmask; and
    etching the exposed core layer.

2. The method of claim 1, further comprising:
    removing remaining portions of the amorphous carbon hardmask; and
    depositing a cladding material on remaining portions of the core layer and exposed portions of the cladding layer.

3. The method of claim 1, wherein the cladding layer has a refractive index lower than a refractive index of the core layer.

4. The method of claim 1, wherein the cladding layer comprises a material selected from the group consisting of undoped silicon dioxide, thermal oxides, or silicon dioxide doped with boron, phosphorous, and combinations thereof.

5. The method of claim 1, wherein the core layer comprises a material selected from the group consisting of germanium doped silicon dioxide, germanium boron doped silicon dioxide silicon-germanium compositions, phosphorous doped silicon dioxide, silicon oxynitride, silicon nitride, silicon, and combinations thereof.

6. The method of claim 1, wherein the core layer comprises a light propagating channel.

7. The method of claim 1, wherein the one or more hydrocarbon compounds are selected from the group consisting of propylene ($C_3H_6$), propyne ($C_3H_4$), propane ($C_3H_8$), butane ($C_4H_{10}$), butylene ($C_4H_8$), butadiene ($C_4H_6$), acetelyne ($C_2H_2$), and combinations thereof.

8. The method of claim 1, further comprising introducing an inert gas into the processing chamber.

9. The method of claim 1, wherein the etch selectivity of amorphous carbon to the core layer is between about 1:8 and about 1:15.

10. A method for forming a waveguide structure on a substrate surface, comprising:
    forming a first cladding layer on the substrate surface;
    forming a core layer on the first cladding layer;
    depositing an amorphous carbon hardmask on the core layer, wherein depositing the amorphous carbon hardmask comprises introducing into a processing chamber one or more hydrocarbon compounds having the general formula $C_xH_y$, wherein x has a range of 2 to 4 and y has a range of 2 to 10, and generating a plasma of the one or more hydrocarbon compounds;
    forming a patterned photoresist layer on the amorphous carbon hardmask;
    etching the amorphous carbon hardmask;
    etching the core layer;
    removing the amorphous carbon hardmask; and
    forming a second cladding layer over the core layer.

11. The method of claim 10, wherein the first cladding layer has a refractive index lower than a refractive index of the core layer.

12. The method of claim 10, wherein the first cladding layer comprises a material selected from the group consisting of undoped silicon dioxide, thermal oxides, silicon dioxide doped with boron, phosphorous, and combinations thereof, and the core material comprises a material selected from the group consisting of germanium doped silicon dioxide, germanium boron doped silicon dioxide silicon-germanium compositions, phosphorous doped silicon dioxide, silicon oxynitride, silicon nitride, silicon, and combinations thereof.

13. The method of claim 10, wherein the second cladding layer comprises the same material as the first cladding layer.

14. The method of claim 10, wherein the second cladding layer comprises a material selected from the group consisting of quartz, silicon oxide, fused silicon oxide, and combinations thereof.

15. The method of claim 10, further comprising:
    depositing a layer of encapsulation material; and
    planarizing the layer of encapsulation material to expose the core layer prior to forming a second cladding layer over the core layer.

16. The method of claim 10, wherein the encapsulation material comprises a material having a refractive index lower than the refractive index of the core layer.

17. The method of claim 10, wherein the core layer has a refractive index higher than the refractive index of the first and second cladding layers.

18. The method of claim 10, wherein the one or more hydrocarbon compounds are selected from the group consisting of propylene ($C_3H_6$), propyne ($C_3R_4$), propane ($C_3H_8$), butane (C4H10), butylene ($C_4H_8$), butadiene (C4H6), acetelyne ($C_2H_2$), and combinations thereof.

19. The method of claim 10, further comprising introducing an inert gas into the processing chamber.

20. The method of claim 10, wherein removing the amorphous carbon hardmask comprises exposing the amorphous carbon hardmask to a plasma of a hydrogen-containing gas or an oxygen containing gas.

21. A method for forming a waveguide structure on a substrate surface, comprising:
    forming a cladding layer on the substrate surface;
    forming a core layer on the cladding layer;
    depositing an amorphous carbon hardmask on the core layer;
    forming a patterned photoresist layer on the amorphous carbon hardmask;
    etching exposed amorphous carbon hardmask: and
    etching exposed core layer, wherein the etch selectivity of amorphous carbon to the core layer is between about 1:8 and about 1:15.

22. The method of claim 21, further comprising:
    removing remaining portions of the amorphous carbon hardmask; and
    depositing a cladding material on remaining portions of the core layer and exposed portions of the cladding layer.

* * * * *

UNITED STATES PATENT AND TRADEMARK OFFICE
CERTIFICATE OF CORRECTION

PATENT NO. : 7,079,740 B2  Page 1 of 1
APPLICATION NO. : 10/799147
DATED : July 18, 2006
INVENTOR(S) : Laurent Vandroux and Herve Monchoix It is certified that error appears in the above-identified patent and that said Letters Patent is hereby corrected as shown below:

In the Claims

Column 11, Claim 1, Line 23: After "etching", delete "the"

Column 12, Claim 18, Line 38: Change "$(C_3R_4)$" to --$(C_3H_4)$--

Column 12, Claim 18, Line 39: Change "(C4H10)" to --$(C_4H_{10})$--

Column 12, Claim 18, Line 40: Change "$(C_4H6)$" to --$(C_4H_5)$--

Signed and Sealed this

Twenty-first Day of November, 2006

JON W. DUDAS
*Director of the United States Patent and Trademark Office*